(12) United States Patent
Ramsden et al.

(10) Patent No.: US 7,683,336 B2
(45) Date of Patent: Mar. 23, 2010

(54) SPECTROMETER WITH PLASTIC SCINTILLATOR PROVIDED WITH A SPECULAR REFLECTOR

(75) Inventors: David Ramsden, Southampton (GB); Christopher David Henry Burt, Southampton (GB)

(73) Assignee: Symetrica Limited, Southampton (GB)

( * ) Notice: Subject to any disclaimer, the term of this patent is extended or adjusted under 35 U.S.C. 154(b) by 0 days.

(21) Appl. No.: 12/300,287

(22) PCT Filed: Mar. 16, 2007

(86) PCT No.: PCT/GB2007/000932
§ 371 (c)(1), (2), (4) Date: Apr. 21, 2009

(87) PCT Pub. No.: WO2007/132139
PCT Pub. Date: Nov. 22, 2007

(65) Prior Publication Data
US 2009/0236533 A1 Sep. 24, 2009

(30) Foreign Application Priority Data
May 12, 2006 (GB) .................................. 0609526.9

(51) Int. Cl.
*G01T 1/20* (2006.01)
(52) U.S. Cl. .................................................. 250/368
(58) Field of Classification Search ............ 250/370.11, 250/370.09, 368
See application file for complete search history.

(56) References Cited
U.S. PATENT DOCUMENTS

| 4,345,153 A | * | 8/1982 | Yin | ............................ 250/369 |
| 4,543,485 A | | 9/1985 | Ishii et al. | |
| 4,658,141 A | | 4/1987 | Wilt et al. | |
| 5,241,180 A | | 8/1993 | Ishaque et al. | |
| 2005/0253073 A1 | * | 11/2005 | Joram et al. | ........... 250/363.03 |

FOREIGN PATENT DOCUMENTS

| EP | 0403613 | 12/1990 |
| EP | 1015910 | 7/2000 |
| EP | 1328827 | 8/2008 |
| WO | WO96/14593 | 5/1996 |
| WO | WO02/31536 | 4/2002 |
| WO | WO2005/001830 | 1/2005 |

* cited by examiner

*Primary Examiner*—David P Porta
*Assistant Examiner*—Marcus H Taningco
(74) *Attorney, Agent, or Firm*—O'Melveny & Myers LLP (57) ABSTRACT

A gamma-ray detector (42, 52, 72, 92) comprising a large-area plastic scintillation body (44, 64, 74, 94) and a photon detector (38, 58, 68, 78) optically coupled to the scintillation body to receive and detect photons ($P_1$, $P_2$, $P_3$) generated by gamma-ray interactions. Selected portions of the scintillation body surface are provided with a reflective layer (46, 60, 80) in planar contact with the scintillation body. Other regions are not provided with a reflective layer. Thus specular reflection is promoted in at the surfaces provided with the reflective layer, while total internal reflection may occur in the regions which are not provided with a reflective layer, hi a scintillation body generally in the form of a plank, the photon detector is coupled to one end, and the regions provided with the reflective layer are the edges of the plank. The scintillation body may be shaped so that it reduced in cross section in a direction away from the photon detector. The spectrometer may include photon detectors coupled to both ends of the scintillation body.

19 Claims, 6 Drawing Sheets

SPECTROMETER WITH PLASTIC SCINTILLATOR PROVIDED WITH A SPECULAR REFLECTOR

BACKGROUND ART

The invention relates to plastic scintillator-based gamma-ray detectors. In particular, the invention relates to surface finishes applied to, and the shape of, plastic scintillation bodies in gamma-ray detectors.

In most commonly-used inorganic (crystal) scintillation counters, the volume of the scintillation body is typically less than 1 liter. For the largest of these detectors, a large diameter photomultiplier tube (e.g. around 8 cm diameter) is used to maximise the collection of photons from gamma-ray interaction events in the scintillation body. The surface finish of such scintillation bodies is typically a finely roughened surface with the crystal packed either in a highly reflective powder (eg MgO), or diffusely reflecting white paper or plastic.

Different surface finishes are generally required for plastic scintillator-based gamma-ray detectors. Plastic scintillators are frequently used in applications where large sensitive areas are required, e.g., on the order 1 $m^2$. The scintillation bodies are often not more than a few cm thick. Large area and relatively flat scintillation bodies such as this are sometimes referred to as scintillator planks. For a generally rectangular plank, the sides having the largest surface may be referred to as faces, the sides having the next largest surface area may be referred to as edges, and sides with the smallest surface area may be referred to as ends.

Most large area plastic scintillation counters are cast between two float-glass plates. This provides the faces of the scintillator plank with a near-optical quality finish. As a consequence, total internal reflection (TIR) readily occurs at these surfaces. The edges of the scintillator planks are typically machined, e.g. using a diamond milling tool, and then polished with a view to providing a similar optical quality surface. Because TIR has a better reflectivity than any other known surface finish, the use of reflecting powders or other diffusively scattering material of the kind used with inorganic scintillation bodies is avoided for large plastic scintillators.

Figure 1A:
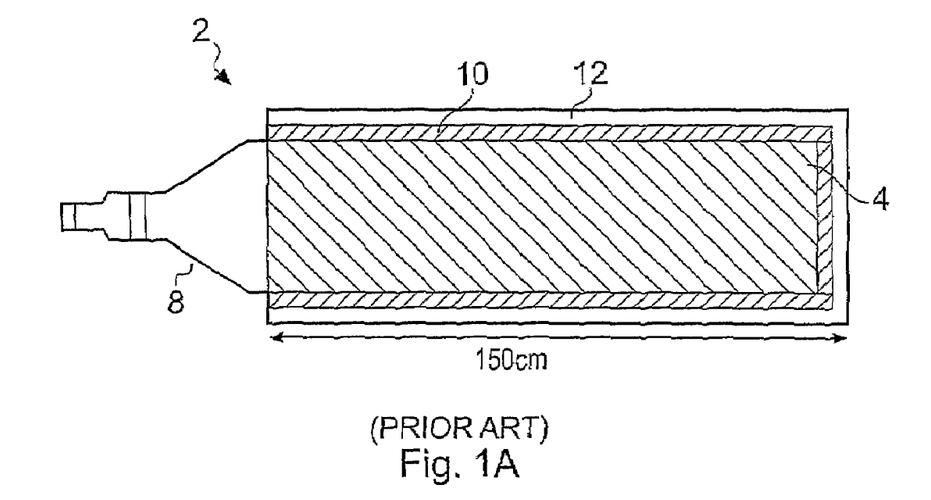
FIG. 1A schematically shows a conventional gamma-ray detector based on a large area plastic scintillator.

FIG. 1A schematically shows a cross-section view of a gamma-ray detector 2 based on a conventionally packaged plastic scintillation body 4. The scintillation body 4 is made of NE-102 plastic scintillator and has dimensions 150 cm×25 cm×4 cm. The view of FIG. 1A is taken in a plane through the centre of the plastic scintillation body 4 and parallel to its faces. One end surface of the scintillation body 4 is coupled to a photo-multiplier tube (PMT) 8 for detecting photons generated in gamma-ray interactions in the scintillator.

The other surfaces of the scintillation body 4 (i.e. its two faces, two sides, and the end not coupled to the PMT) are wrapped in a layer of aluminium foil 10. Conventional aluminium foil of the kind used in cooking is typically used. The aluminium foil layer is "crinkled" so that it is not in direct contact with the scintillation body over most of its surface. This helps to reduce the effect of the aluminium foil on TIR occurring at the scintillation body surface. The perceived benefit of the aluminium foil is in helping to reflect photons that have exited the scintillation body (i.e. photons that did not undergo TIR) back into the scintillation body. The aluminium foil 10 is wrapped in a layer of a black vinyl 12 for protection and to help to ensure the assembly is light-tight so as to prevent photons not associated with gamma-ray interactions within the scintillator from reaching the PMT.

Figure 1B:
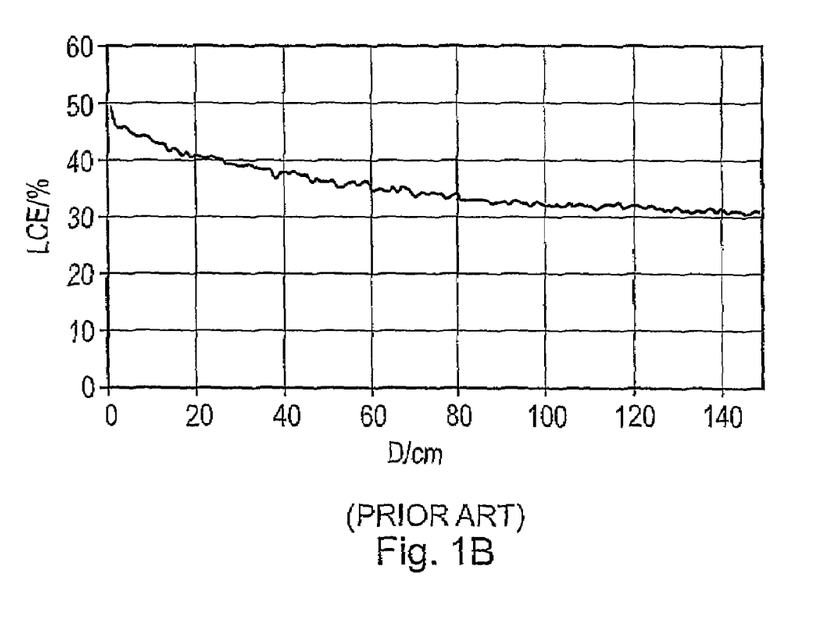
FIG. 1B schematically shows the modelled light collection efficiency of the detector shown in FIG. 1A as a function of the position of a gamma-ray interaction.

FIG. 1B is a curve showing the modelled light collection efficiency (LCE) for the detector 2 shown in FIG. 1A. The LCE is shown as a function of distance D from one end of the scintillation body (the end coupled to the PMT) to the gamma-ray interaction site. The LCE is the fraction photons generated in a typical gamma-ray interaction which subsequently reach the sensitive area of the PMT.

As can be seen from FIG. 2, the maximum LCE is around 45%. This is for interactions occurring towards the end of the scintillation body 4 which is nearest to the PMT 8. For gamma-ray interactions occurring at the other end of the scintillation body, the LCE is just over 30%.

In a scintillator-based gamma-ray detector such as shown in FIG. 1A, the energy deposited by gamma-rays (i.e., the energy loss spectrum) is determined from the light energy recorded at the PMT as a result of each gamma-ray interaction. An estimate of the incident gamma-ray spectrum is then derived from the energy loss spectrum by taking account of how the detector responds to incident gamma-rays. It is therefore important to measure the energy loss spectrum (i.e., the energy deposited by gamma-rays in the scintillation body) as accurately as possible if the best possible estimates of the incident gamma-ray spectrum are to be obtained. In an ideal detector, a given deposition of energy in the scintillation body will lead to a given signal from the PMT. Thus a measured output signal can be converted to an estimate of the energy lost in the scintillation body by an incident gamma-ray. Accordingly, the LCE, and its variance with interaction position, plays an important role in determining the energy resolution of a gamma-ray spectrometer based on a scintillator detector. Firstly, a poor LCE leads to poor counting statistics with a corresponding uncertainty in the output signal measured by the PMT. Secondly, in addition to this statistical noise, the variation in LCE with position means that an interaction near to the PMT in FIG. 1A leads to an output signal from the PMT that can be as much as 50% higher than that from an interaction at the other end of the scintillation body. If a linear relationship between PMT output signal and incident gamma-ray energy is assumed, this variance can lead to a 50% uncertainty in an incident gamma-ray photon's energy.

Most applications for large area/volume plastic scintillator detectors are as triggering devices in charged particle detectors. For these applications the significance of the LCE and its variance are frequently not of concern. However, there has been recent interest in using large area plastic scintillator-based detectors as relatively low-resolution gamma-ray spectrometers [1]. In these cases there is a need to improve the LCE and reduce variations in response as much as possible because of the influence of these factors on the energy resolution of such spectrometers.

Figure 2A:
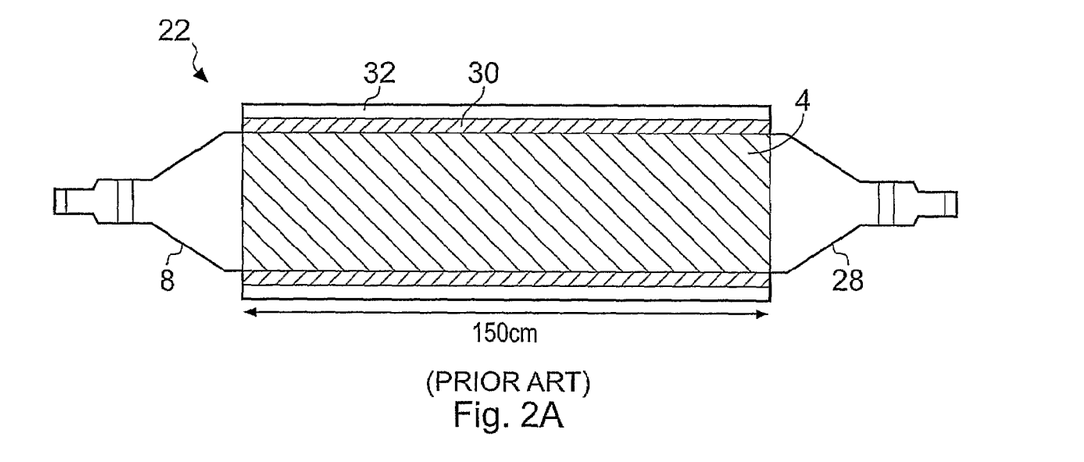
FIG. 2A schematically shows another conventional gamma-ray detector based on a large area plastic scintillator.

FIG. 2A schematically shows a cross-section view of another known gamma-ray detector 22. This detector 22 employs a known technique for increasing LCE and reducing its variance [1]. Features of the detector 22 shown in FIG. 2A which are similar to, and will be understood from the corresponding description of, features of the detector 2 shown in FIG. 1A are identified by the same reference numerals. Thus the detector again comprises a 150 cm×25 cm×4 cm NE-102 scintillation body 4 coupled to a PMT 8 for detecting photons generated in gamma-ray interactions in the scintillator. However, in addition to this PMT 8, the detector 22 comprises a second PMT 28. The second PMT 28 is at the opposite end of the scintillation body to the first PMT 8. Thus photons can be detected at both ends of the scintillation body 4. The exposed sides of the scintillation body 4 (i.e. its two faces and two edges) are wrapped in a layer of aluminium foil 30 with an overlying layer of a black vinyl 32 in the same way as described above for the detector 2 in FIG. 1A.

Figure 2B:
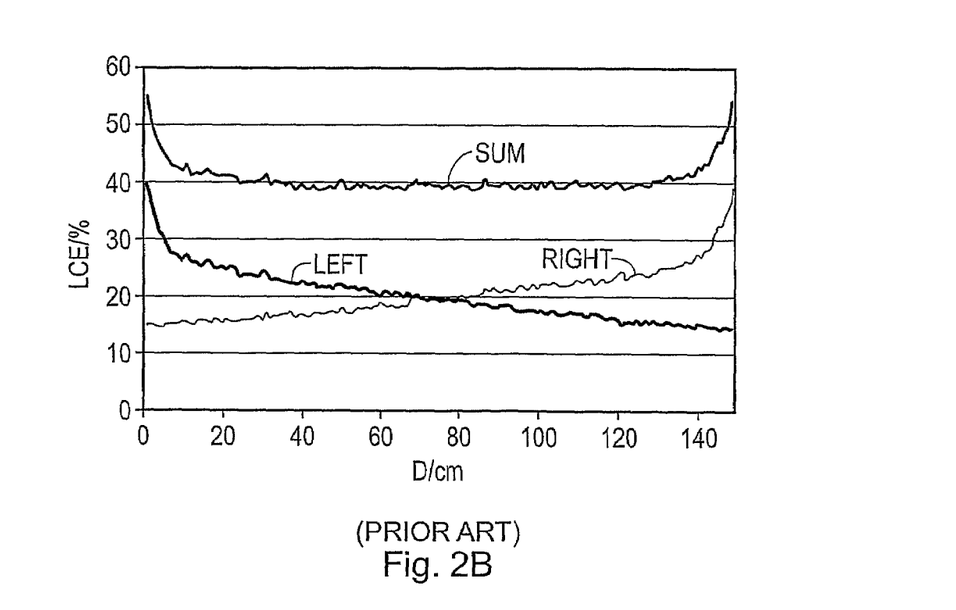
FIG. 2B schematically shows the modelled light collection efficiency of the detector shown in FIG. 2A as a function of the position of a gamma-ray interaction.

FIG. 2B is a curve showing the modelled LCE as a function of position D measured from the left-hand end of the scintillation body 4 (for the orientation shown in FIG. 2A). FIG. 2B is similar to, and will be understood, from FIG. 1B. However, three curves are shown in FIG. 2B. The curve marked LEFT shows the modelled LCE for the PMT 8 at the left-hand end of the scintillation body 4. The curve marked RIGHT shows the modelled LCE for the PMT 28 at the right-hand end of the scintillation body 4. The curve marked SUM shows the modelled LCE obtained by summing the outputs from both PMTs 8, 28.

The curve marked LEFT is similar to the curve shown in FIG. 1B, but shows a slightly lower LCE. This is because photons that would have been reflected from the end of the scintillator body opposite the PMT 8 in FIG. 1A, are not reflected in the detector 22 of FIG. 2A, but are instead coupled out of the scintillation body to the second PMT 28. Due to the symmetry of the detector the curve marked RIGHT is in effect a mirror image of the curve marked LEFT.

It can be seen from the curve marked SUM in FIG. 2B that by summing the signals from both PMTs 8, 28, the LCE is increased to a relatively uniform level of around 40% over the central 70% or so of the length of the scintillation body. However, more than half the photons are still being lost, and the LCE still varies considerably over the last 15% or so of the length of the scintillation body towards the ends. The LCE is around 25% higher for gamma ray interactions near to an end compared to interactions near the centre. With an assumed linear relationship between PMT output signal and incident gamma-ray energy, this leads to a 25% uncertainty in incident energy.

Accordingly, there is a need for large area plastic scintillator-based detectors having improved LCE and reduced variation in LCE along their length.

SUMMARY OF THE INVENTION

According to a first aspect of the invention there is provided a gamma-ray spectrometer comprising a plastic scintillation body for receiving gamma-rays and creating photons therefrom, a photon detector optically coupled to the scintillation body so as to receive and detect the photons, and a reflective layer in planar contact with selected regions of the surface of the scintillation body so as to promote specular reflection in these selected regions.

The reflective layer may comprise, for example, a reflector bonded to the surface of the scintillation body or a reflective coating deposited on the surface.

By promoting specular reflection in selected regions (as opposed to total internal reflection), improved light collection efficiency (LCE) characteristics in terms of magnitude and uniformity can be obtained.

The outer surfaces of scintillation bodies often have areas of differing optical flatness, for example because the surfaces may have faces that were cast between near optical quality glass and edges which were machined. The selected regions may be regions of relatively low optical flatness. In this way, specular reflection may be promoted in regions where TIR does not occur efficiently due to the relatively low optical quality surface.

The scintillation body may be elongate and substantially rectangular in cross section at positions along its length, such that the scintillation body is bound by two faces and two edges which are substantially parallel to the axis of extent (e.g. within 20 degrees or so), and two ends which are substantially perpendicular to the axis of extent (e.g. within 20 degrees or so), and wherein the photon detector is optically coupled to one of the ends. This provides an efficient way of matching a plank-like scintillation body to a relatively small area photon detector.

The regions selected for having the reflective layer applied may be the edges of the scintillation body, and in some cases also the end which is not coupled to the photon detector. The faces may be regions which do not have a reflective layer in planar contact with the scintillation body surface.

The cross-section of the scintillation body (i.e. its cross sectional area or at least one dimension of its cross-section) may reduce, for example substantially linearly, with increasing distance from the photon detector. This promotes the directing of photons reflected from the surface of the scintillation body towards the photon detector, thus reducing the overall number of reflections required to reach it.

The cross-sectional area may, for example, reduce by between 15% and 25% along the length of the scintillation body, e.g. by 20%. This degree of taper provides a compromise between directing photons to the photon detector and not overly reducing the sensitive area of the scintillation body.

The gamma-ray spectrometer may further comprise a second photon detector optically coupled to the end of the scintillation body opposite to the end to which the first-mentioned photon detector is coupled. This allows a greater proportion of generated photons to be detected, and also the summing of signals from both photon detectors, e.g., using a processor, can lead to improved uniformity of response. Furthermore, having photon detectors at both ends can also allow position estimates to be made for gamma-ray interactions, e.g. based on a ratiometric analysis of the outputs from the photon detectors.

The cross-sectional area of the scintillation body may reduce, for example substantially linearly, towards the centre of the scintillation body with increasing distance from both the first mentioned and the second photon detectors. This configuration promotes the directing of photons reflected from the surface of the scintillation body towards the nearest photon detector, thus reducing the overall number of reflections required.

The cross-sectional area may reduce by between 15% and 25% between the respective photon detectors and the centre of the scintillation body.

The gamma-ray spectrometer may be wrapped in a layer of crinkled aluminium foil to create an air gap adjacent the surface regions not having the reflective layer in planar contact so as to promote total internal reflections from these areas, while helping to avoid environmental light from entering the scintillation body.

The gamma-ray spectrometer may further comprise a light-blocking layer, e.g. black PVC or paper, wrapped around the scintillation body. This further helps avoid environmental light from entering the scintillation body.

The gamma-ray spectrometer may further comprise a processor operable to process energy loss data obtained by the gamma-ray spectrometer by deconvolution using a response function computed for the gamma-ray spectrometer.

According to a second aspect of the invention there is provided a method of gamma-ray spectroscopy comprising: providing an object to be analysed based on gamma rays, and collecting energy-loss data for the object with a gamma-ray spectrometer comprising a plastic scintillation body for receiving gamma-rays and creating photons therefrom, a photon detector optically coupled to the scintillation body so as to receive and detect the photons, and a reflective layer in planar contact with selected regions of the surface of the scintillation body so as to promote specular reflection in these selected regions.

The method may further comprise processing the energy-loss data by deconvolution using a response function computed for the gamma-ray spectrometer.

BRIEF DESCRIPTION OF THE DRAWINGS

For a better understanding of the invention and to show how the same may be carried into effect reference is now made by way of example to the accompanying drawings in which.

DETAILED DESCRIPTION

The Inventors have appreciated that the conventional method of packaging scintillation bodies as described above is not optimal for maximising LCE and reducing its variance. The roll-off in LCE with increasing distance from an interaction site to a PMT is not due solely to increased attenuation from longer path lengths. A significant fraction of the loss is caused by an increase in the number of photons which are lost at the surface of the scintillation body because of the increased number of reflections that photons generated further from the PMT must undergo. The Inventors have studied the transfer mechanism for photons generated in gamma-ray interactions within scintillation bodies with a view to improving on the magnitude and uniformity of the LCE obtained with conventional detectors/spectrometers.

Figure 3:
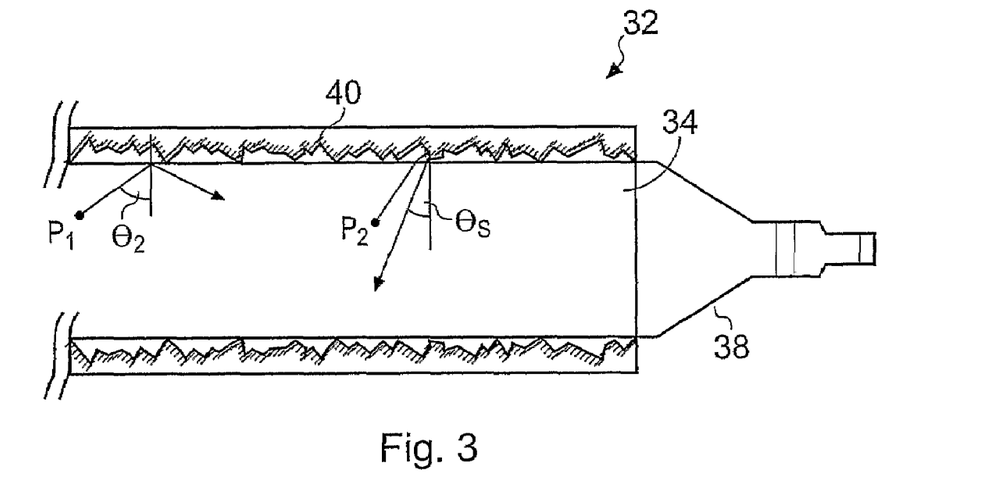
FIG. 3 schematically shows photons interacting with the surface of a gamma-ray detector of the kind shown in FIG. 1A or FIG. 2A.

FIG. 3 schematically shows a cross-section view of a gamma-ray detector 32 based on a conventionally packaged plank-like plastic scintillation body 34 similar to that shown in FIG. 1A. Thus the scintillation body 34 is wrapped in a crinkled layer of aluminium foil 40. The view of FIG. 3 is taken in a plane through the centre of the plastic scintillation body 34 and parallel to its faces. One end surface of the scintillation body 34 is coupled to a PMT 38.

The respective paths of a first photon $P_1$ and a second photon $P_2$ generated in the scintillation body are schematically shown in FIG. 3. (It will be understood that these photons are shown by way of individual examples, and in practice each gamma-ray interaction will give rise to a large number of photons travelling in largely random directions.) The first photon $P_1$ travels parallel to the faces of the scintillation body and in a direction that intersects the surface of the scintillation body along its edge at a relatively large angle of incidence $\theta_L$. $\theta_L$ is larger than the critical angle $\theta_C$ for total internal reflection (TIR) to occur at the boundary as determined from the relative refractive indices of the plastic scintillator (typically around 1.6) and the air between the surface of the scintillation body and the overlying crinkled layer of aluminium foil 40 (around unity). The second photon $P_2$ also travels parallel to the faces of the scintillation body, but intersects the edge at a relatively small angle of incidence $\theta_S$. $\theta_S$ is smaller than the critical angle $\theta_C$.

The Inventors have appreciated that although the first photon is within the range of angles for which TIR can occur, the machined and polished surfaces at the edges of a typical plastic scintillation body are not of sufficiently good optical quality for TIR to occur with near 100% efficiency. Nonetheless, the reflectivity is still relatively high, and there is a correspondingly high chance that the first photon $P_1$ will be reflected from the surface back into the scintillation body, as shown in FIG. 3. The first photon will then go on to strike the surface of the opposing edge of the scintillation body at the same angle $\theta_L$, with a similarly high chance of being reflected. Thus the first photon is ducted along the scintillation body towards the PMT 38.

However, the second photon $P_2$ strikes the surface of the scintillation body at an angle $\theta_S$ which is less than the critical angle $\theta_C$. Because of this the second photon will more likely than not exit the scintillation body. When this happens it will typically strike the crinkled layer of aluminium foil and be reflected back towards, and re-enter, the scintillation body. Once a photon has exited the scintillation body, it is impossible for it to re-enter in such a way that it will next strike the opposing scintillation body surface at an angle greater than the critical angle. Thus the second photon will exit the scintillation body each time it strikes the opposing surfaces and will only re-enter it if it is reflected by the aluminium foil. The efficiency of reflection from the layer of aluminium foil will typically be around 80%. Furthermore, the crinkled nature of the foil means that while the first photon $P_1$ makes steady progression towards the PMT, the second photon $P_2$ progresses in a quasi-random walk manner and so typically undergoes many more reflections before it can reach the PMT. The net effect of this is that photons striking the surface at angles less than the critical angle have only a small overall chance of making it to the PMT 38 for detection. Furthermore, this chance reduces rapidly with the distance from the interaction site to the PMT 38. In the Inventors' view, the conventional wrapping of scintillation bodies in crinkled foil serves no useful purpose so far as improving the LCE characteristics of the detector are concerned.

Figure 4:
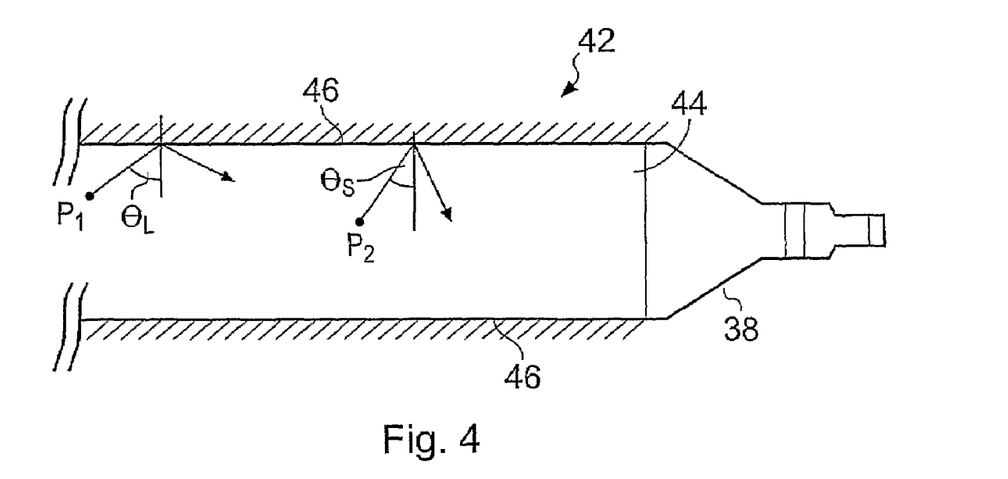
FIG. 4 schematically shows photons interacting with the surface of a gamma-ray detector according to an embodiment of the invention.

FIG. 4 schematically shows a cross-section view of a portion of a gamma-ray detector 42 according to an embodiment of the invention. The detector 42 comprises a scintillation body 44 made of NE-102 plastic scintillator and having dimensions 150 cm×25 cm×4 cm (i.e. generally in the form of a rectangular plank). The view of FIG. 4 is taken in a plane through the centre of the plastic scintillation body 44 and parallel to its faces (i.e. parallel to the largest area external surfaces). An end surface of the scintillation body 44 is optically coupled to a PMT 48 for detecting photons generated in gamma-ray interactions in the scintillation body 44. The inventors have found that direct optical coupling (i.e. abutting) the PMT to the scintillation body provides the best LCE (with any parts of the sensitive area of the PMT which are not directly coupled to the scintillation body (e.g. because of a mis-match in shape) appropriately masked). If desired, however, an intermediate optical coupling element for coupling photons exiting from the end of the scintillation body to a photo-detector could be used. The gamma-ray detector 42 differs from that of FIG. 3 in that a reflective layer 46 in planar contact with the edges of the scintillation body is provided in place of the crinkled foil layer 40 of FIG. 3. This is contrary to conventional design practice because the reflective layer 46 in planar contact with the scintillation body 34 frustrates TIR because of the lack of an air gap over extended regions. In this example, the reflective layer 46 is provided by a reflecting strip having a high reflectivity, e.g. 98.5% in the spectral region of interest, which is bonded to the edges of the scintillation body. For example, a multi-layer dielectric coated plastic film, such as the 3M company product Vikuiti™, may be used.

The paths of first and second photons $P_1$, $P_2$, which are similar to and will be understood from the first and second photons discussed above in connection with FIG. 3, are again shown. The reflective layer 46 promotes specular reflection at all angles of incidence and thus both the first and second photons have a relatively high change of being reflected at the scintillation body edges regardless of the angle of incidence. Thus unlike the situation in FIG. 3, the second photon $P_2$ of FIG. 4 has a much increased chance of being reflected at the scintillation body surface, even though it intersects the surface at an angle less than that required for TIR in FIG. 3. Thus both photons in FIG. 4 are ducted towards the PMT.

However, the Inventors have realised that there is a need to compromise between promoting TIR (by using a crinkled foil layer to provide an air gap) and promoting specular reflection (by providing a reflective layer in planar contact with the scintillation body). With TIR, only those photons intersecting the surface at angles greater than the critical angle are reflected, but these photons can be reflected with near 100% efficiency. On the other hand, with specular reflection, photons over a much wider range of angles are reflected at the scintillation body surface, but with a reduced efficiency.

The Inventors have performed extensive modelling for predicting the performance of a number of different designs for gamma-ray detectors based on scintillation bodies using optical Monte Carlo simulation methods. These simulations have focussed on comparing the overall LCE and the uniformity of the response with position of various designs of gamma-ray detector. From this the Inventors have appreciated that for a conventional plastic scintillation body having faces cast between float glass (i.e. having good optical quality) and edges which are machined (i.e. having less good optical quality), the best LCE characteristics can be achieved by promoting TIR at the cast faces of the scintillation body and specular reflection at the machined edges. This approach has been found to provide better LCE characteristics than either wrapping the whole scintillation body in crinkled aluminium foil to promote TIR at all surfaces, or by providing a reflective layer in planar contact with all of the exposed (i.e. not directly coupled to the PMT or other photon detector) surface to promote specular reflection at all surfaces rather than in selected regions.

Figure 5A:
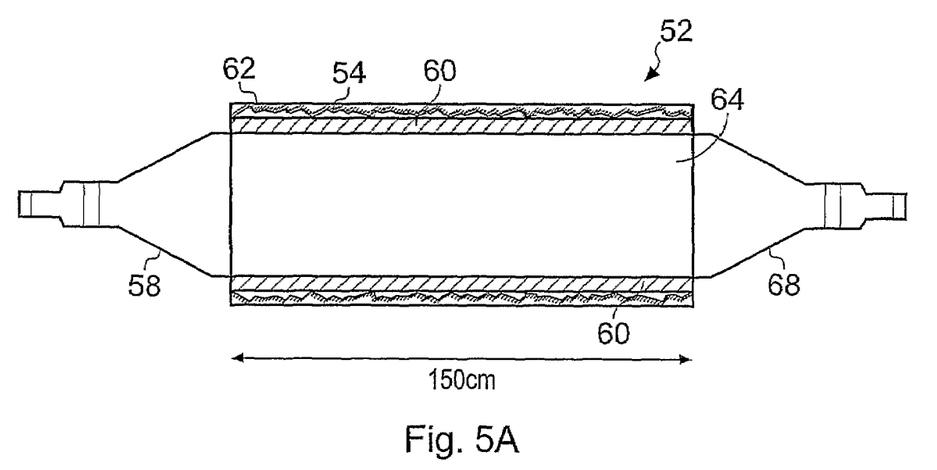
FIG. 5A schematically shows a gamma-ray detector based on a large area plastic scintillator according to an embodiment of the invention.

FIG. 5A schematically shows a cross-section view of a gamma-ray detector 52 according to another embodiment of the invention. The detector 52 is similar to the detector 42 shown in FIG. 4 in that it comprises a scintillation body 64 having a highly reflecting (for example >~98.5%) strip 60 bonded to the edges of the scintillation body. The scintillation body 64 is again made of NE-102 plastic scintillator and has dimensions 150 cm×25 cm×4 cm. The two end surfaces of the scintillation body 64 are optically coupled to respective PMTs 58, 68 for detecting photons generated in gamma-ray interactions in the scintillation body 64.

The faces of the scintillation body (i.e. the largest area surfaces) are not provided with any reflective layer in planar contact with the scintillation body. Instead these surfaces are covered in a layer of crinkled aluminium foil 54 in a manner similar to that described above in connection with FIG. 3. For convenience the crinkled layer of aluminium foil may be wrapped around the faces and the edges, even though the edges are already provided with the reflecting strip 60. Because of the underlying reflecting strip 60 the layer of aluminium foil 54 does not play a roll in reflecting photons from the edges of the scintillation body, but wrapping both the exposed faces and the strip covered edges in crinkled foil can make assembly easier. As previously described, the aluminium foil layer is crinkled so that it is not in direct contact with the faces of the scintillation body over most of their surface areas. Thus TIR is promoted at the faces of the scintillation body while specular reflection from the reflective strip 60 is promoted at the edges. The scintillation body is wrapped in a layer of a black vinyl 62 for protection and to help to ensure the assembly is light tight so as to prevent photons not associated with gamma-ray interactions within the scintillator from reaching the PMT.

Figure 5B:
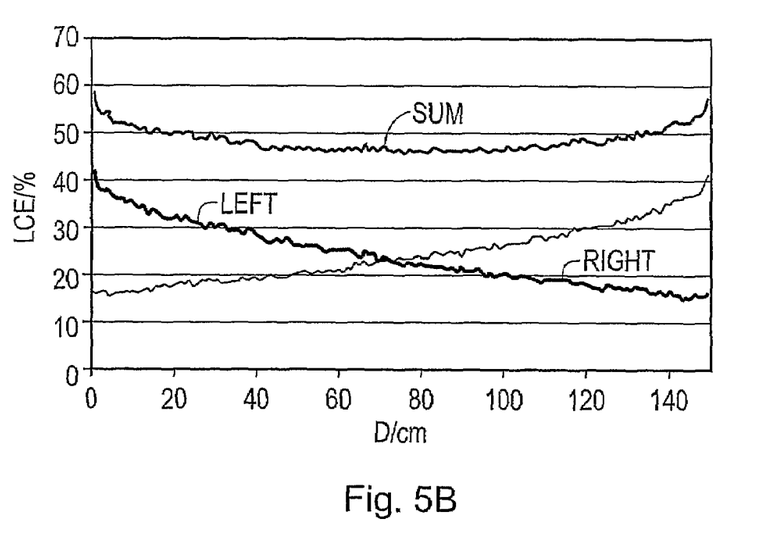
FIG. 5B schematically shows the modelled light collection efficiency of the detector shown in FIG. 5A as a function of the position of a gamma-ray interaction.

FIG. 5B shows the LCE for the gamma-ray detector shown in FIG. 5A as a function of the position D of a gamma-ray interaction within the scintillation body. Position D is measured from the end of the scintillation body which is left-most for the orientation shown in FIG. 5A. FIG. 5B is thus similar to, and will be understood, from FIG. 2B.

The curve marked LEFT in FIG. 5B shows the modelled LCE for the PMT 58 at the left-hand end of the scintillation body 64. The curve marked RIGHT shows the modelled LCE for the PMT 68 at the right-hand end of the scintillation body 64. The curve marked SUM shows the modelled LCE obtained by summing the outputs from both PMTs 58, 68.

The curve marked LEFT is broadly similar in overall shape to the corresponding curve shown in FIG. 2B. However, it can be seen that there are some differences. The curves for the left-hand PMT in FIGS. 2B and 5B are both at around 40% for positions D of around 0 cm, although the curve in FIG. 5B is slightly higher. This is because most of the photons detected by the left-hand PMTs from gamma-ray interactions at D=0 cm do not undergo any reflections from the edges of the scintillation body (since the end of the scintillation body subtends such a large solid angle at D=0 cm). Accordingly the surface finish at the edges does not play a significant role in the transfer of these photons. However, along the remainder of the length of the scintillation body, the curve marked LEFT in FIG. 5B is significantly higher than the corresponding curve in FIG. 2B. For example, at D=75 cm (i.e. half-way) the curve in FIG. 5B shows an LCE of almost 25% while the curve in FIG. 2B is only 20%. Thus the reflecting strips 60 in planar contact with the edges of the scintillation body improve the LCE by around 20% to 25% for gamma-ray interaction events occurring towards the centre of the scintillation body. The variance in LCE with position can also be seen to be smaller in FIG. 5B, particularly for gamma-ray interactions occurring in the 20 cm or so of the scintillation body nearest to the PMT.

Because of the symmetry of the gamma-ray detector 52 shown in FIG. 5B, the curve marked RIGHT is in effect a mirror image of the curve marked LEFT.

The curve marked SUM in FIG. 5B is obtained by summing the signals from both PMTs 58, 68. This summed LCE has a value of around 50%, or a few percent below, over the central 70% or so of the length of the scintillation body. Thus the summed LCE for the gamma-ray detector shown in FIG. 5B is around 20% higher than that in FIG. 2B for all gamma-ray interaction positions further than a few cm from one of the scintillation body ends.

As noted above, the Inventors have found that the best results are obtained when only selected regions of the scintillation body surface are provided with the a reflecting layer in planar contact with the scintillation body (in the example the machined edges and not the float-glass cast faces). In particular, the Inventors have found improvements when the regions are selected so that the number of reflections encountered by a ray at the bonded reflector surface is small compared with the number of total internal reflections encountered at the other surfaces. This means that whilst a useful increase in LCE can be achieved by adding a reflector to the edges of a wide plank as shown in FIGS. 5A and 5B, it can be counter-productive to bond a reflector to all four surfaces of a detector having a square cross-section.

Figure 6A:
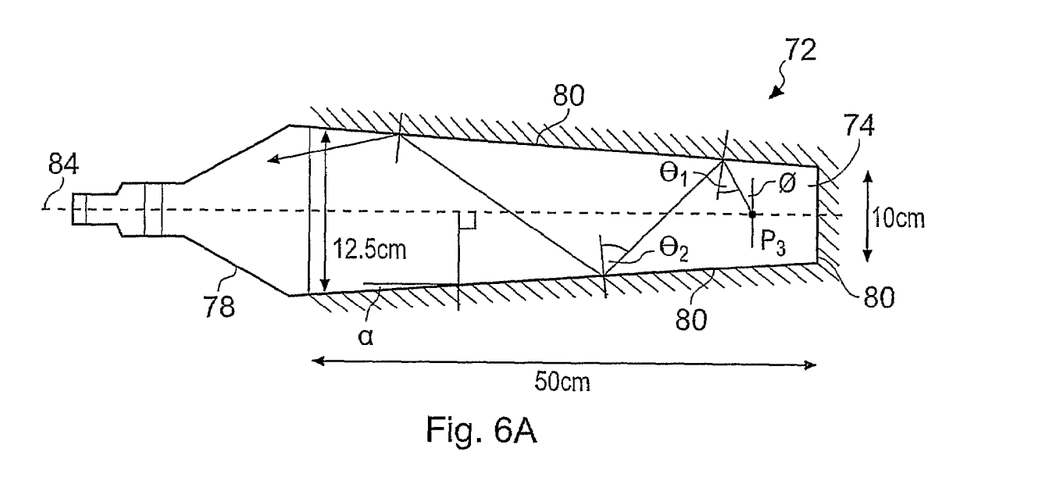
FIG. 6A schematically shows a gamma-ray detector based on a large area plastic scintillator according to another embodiment of the invention.

FIG. 6A schematically shows a cross-section view of a gamma-ray detector 72 according to another embodiment of the invention. The detector comprises a scintillation body 74 directly optically coupled to a PMT 78 for detecting photons generated in gamma-ray interactions in the scintillation body 74 (as with the other embodiments an intermediate optical coupling element may be used instead of direct coupling). The scintillation body 74 is generally flat in the plane of FIG. 6A, but reduces in its width with increasing distance from the PMT 78. This shape may be referred to as a tapered plank. In this example the scintillation body is again made of NE-102 plastic scintillator. The scintillation body is 4 cm thick (in a direction perpendicular to the plane of FIG. 6A) and tapers in width from 12.5 cm at the end coupled to the PMT down to 10 cm over a distance of 50 cm. Thus the detector shown in FIG. 6A is overall more compact than that shown in FIG. 5A and so may be more easily used, for example, as a hand-held detector. The detector 72 further comprises a highly reflecting (for example >~98.5%) strip 80 bonded to the edges of the scintillation body and also the end which is not optically coupled to the PMT 78. The reflecting strip 80 thus provides a reflective layer in planar contact with selected regions of the surface of the scintillation body 72 so as to promote specular reflection from these edges.

The faces of the scintillation body (i.e. the tapering and largest area surfaces) are not provided with any reflective layer in planar contact with the scintillation body. Instead these surfaces are covered in a layer of crinkled aluminium foil (not shown) in a manner which is similar to and will be understood from the above description of the layer of aluminium foil 54 shown in FIG. 5A. Thus TIR is promoted at the faces of the scintillation body while specular reflection from the reflective strip 80 is promoted at the edges and one of the ends. As before, the scintillation body is wrapped in a layer of a black vinyl (not shown) for protection and to help to ensure the assembly is light tight.

As explained above, with a generally rectangular scintillation body such as shown in FIG. 5A, photons which for a conventionally wrapped detector would escape from the edges on the scintillation body (because they strike at less than the critical angle for TIR) can be ducted along the scintillation body by the reflecting layer in planar contact with the scintillation body. However, photons which strike the reflecting edges at angles less than the critical angle will nonetheless need to undergo a relatively high number reflections to make progress towards the end(s) of the scintillation body to which the photo-detector(s) is(are) coupled. The tapering form of the scintillation body 74 of FIG. 6A helps reduce the number of reflections that photons must undergo to progress towards the end of the scintillation body coupled to the PMT 78.

The path of an example photon $P_3$ generated in the scintillation body 74 is schematically shown in FIG. 6A. (It will again be understood that this is merely an individual example photon, and in practice a gamma-ray interaction will give rise to many photons travelling in largely random directions.) The photon $P_3$ travels parallel to the faces of the scintillation body 74 (i.e. in the plane of FIG. 6A) and in a direction which is angled towards the PMT 78 at angle $\phi$ to a central axis of extent 84 of the scintillation body.

In the case of a generally rectangular scintillation body such as shown in FIG. 5A, a photon whose direction forms an angle $\phi$ with a central axis of the scintillation body will intersect the edge at an angle of incidence which is the same angle $\phi$. However for a tapered scintillation body 74 such as shown in FIG. 6A, the photon will intersect the edge at an angle of incidence $\theta_1$ which is greater than the angle $\phi$. This is because a normal to the edge is not perpendicular to the central axis of extent 84 for the scintillation body. For example, if the scintillation body is tapered such that the edges form an angle $\alpha$ with the central axis of extent 84, the angle of incidence for the photon $P_3$ on its first bounce is $\theta_1 = \phi + \alpha$. This greater angle of incidence means the photon is deflected more towards the PMT end of the scintillation body 74 than it would be with a non-tapered scintillation body. Thus following its first reflection the photon $P_3$ next crosses the central axis of extent at an angle $\phi + 2\alpha$, and subsequently intersects the opposing edge of the scintillation body at an angle $\theta_1 = \phi + 3\alpha$. This further deflects the photon $P_3$ preferentially towards the PMT 78. Thus the photon $P_3$ reaches the PMT 78 after undergoing fewer reflections than would be the case with a non tapered scintillation body, so further improving the LCE of the scintillation body.

Figure 6B:
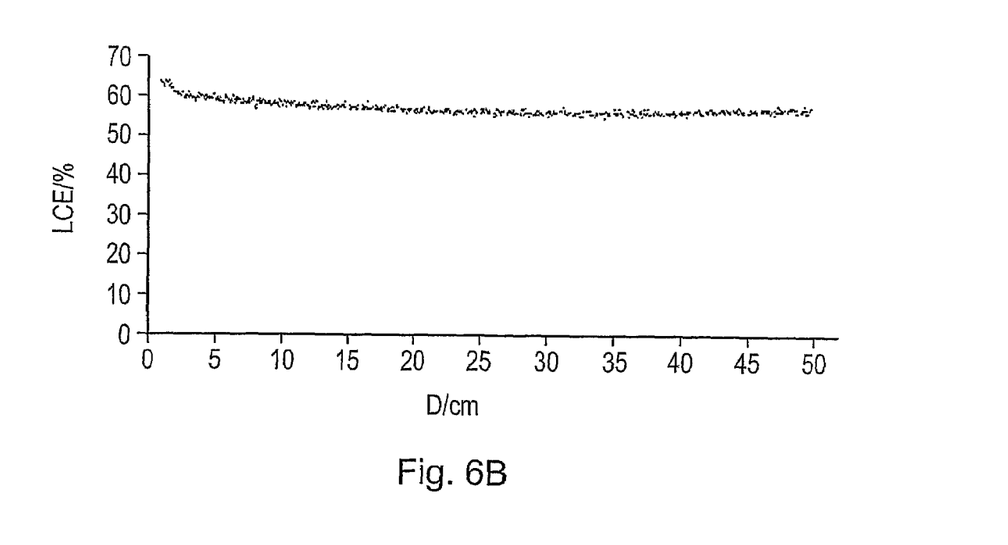
FIG. 6B schematically shows the modelled light collection efficiency of the detector shown in FIG. 6A as a function of the position of a gamma-ray interaction.

FIG. 6B is a curve showing the modelled LCE for the detector 72 shown in FIG. 6A. The LCE is shown as a function of distance D between the end of the scintillation body 74 coupled to the PMT 78, and the gamma-ray interaction site. As can be seen from FIG. 6B, the LCE is around 60% along the entire length of the scintillation body with little variation. The overall LCE characteristics of the detector 72 shown in FIGS. 6A and 6B are therefore significantly improved over the conventionally wrapped and shaped detector 2 shown in FIGS. 1A and 1B. This is the case even if only the first 50 cm or so of the detector 2 shown in FIGS. 1A and 1B is considered (i.e. a length corresponding the length of the scintillation body in FIGS. 6A and 6B).

In general, the steeper the taper, the more the photons are preferentially directed towards an output end of the scintillation body. However, if the taper is too steep, the effective sensing area for a given length of scintillation body can be reduced by too much an amount. The Inventors have found that a reduction in width of between around 15% and 25%, e.g. 20%, over the length of the scintillation body provides a reasonable compromise between these competing factors.

Figure 7A:
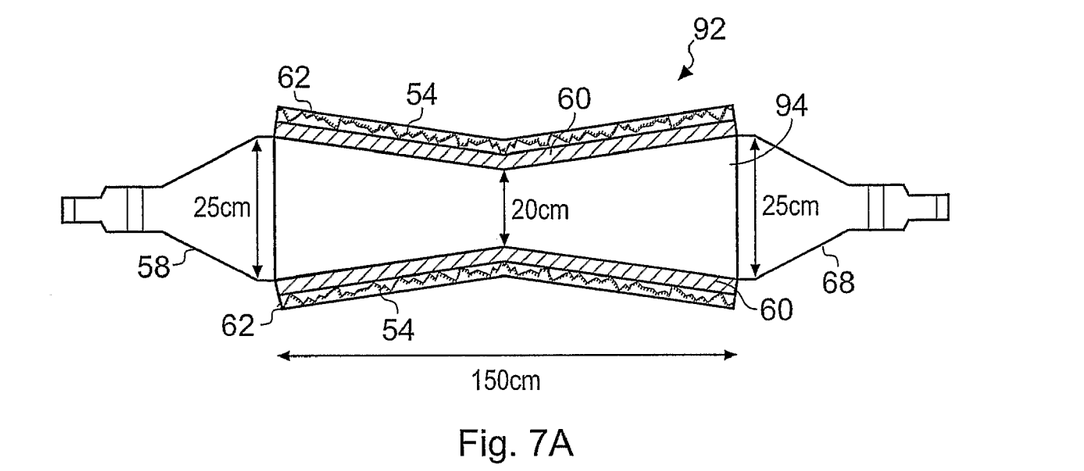
FIG. 7A schematically shows a gamma-ray detector based on a large area plastic scintillator according to another embodiment of the invention.

FIG. 7A schematically shows a cross-section view of a gamma-ray detector 92 according to another embodiment of the invention. Features of the detector 92 shown in FIG. 7A which are similar to and will be understood from corresponding features of the detector 52 shown in FIG. 5A are indicated by the same reference numerals. However, the detector 92 shown in FIG. 7A comprises a scintillation body 94 that is a different shape to the scintillation body of the design shown in FIG. 5A. In effect, the detector 92 combines the "double-ended" feature of FIG. 5A (i.e. PMTs optically coupled to both ends) with the "tapered" feature of FIG. 6A. Thus the scintillation body 94 is generally flat in the plane of FIG. 7A, but reduces in its width with increasing distance from each of its ends to its centre. This shape may be referred to as a double-tapered plank. In this example the scintillation body is again made of NE-102 plastic scintillator and is 4 cm thick (in a direction perpendicular to the plane of FIG. 7A) and 150 cm long. The scintillation body 94 tapers in width (i.e. distance between edges) from around 25 cm at its ends to around 20 cm at its centre. This double-ended taper design allows the benefits of the tapered form discussed above to be more practically employed in a detector having an overall length greater than that of the detector shown in FIG. 6A. Thus photons which reflect from the edges of the scintillation body 94 in the left-hand half are steered towards the left-hand PMT 58 and photons which reflect from the edges of the scintillation body 94 in the right-hand half are steered towards the right-hand PMT 68.

Figure 7B:
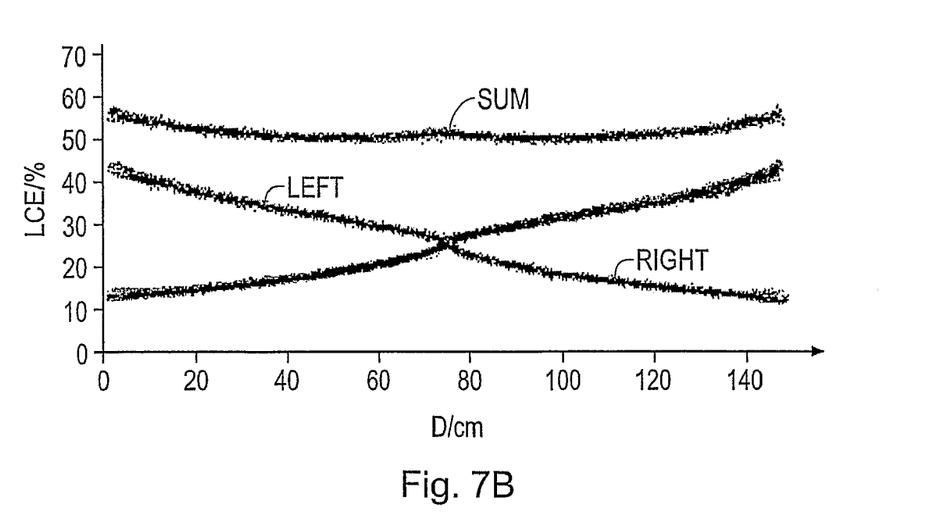
FIG. 7B schematically shows the modelled light collection efficiency of the detector shown in FIG. 7A as a function of the position of a gamma-ray interaction.

FIG. 7B is a curve showing the modelled LCE for the detector 92 shown in FIG. 7A. This figure is similar to and will be understood from FIG. 5B. As can be seen from FIG. 7B, the LCE associated with the summed outputs from the PMTs (curve marked SUM) is around 55% along the entire 150 cm length of the scintillation body with little variation. The overall LCE characteristics of the detector 92 shown in FIGS. 7A and 7B are therefore significantly improved over the conventionally wrapped and shaped "double-ended" detector 22 shown in FIGS. 2A and 2B. For example, the summed LCE shown is FIG. 7B is over a third higher over most of the length of the scintillation body (i.e. around 55% compared to around 40%), and varies by only a few percent, compared to around 35% seen in FIG. 2B. Furthermore, the individual outputs from the left- and right PMTs (marked LEFT and RIGHT respectively) are more linear in FIG. 7B than in FIG. 2B.

A further benefit of "double-ended" embodiments of the invention, e.g. as shown in FIGS. 5A and 7A, is the ability to the estimate of a gamma-ray interaction from the relative signals from each of the two PMTs 58, 68. For example, the ratio of the outputs may be compared with a look-up table, which may be determined empirically or based on modelling such as shown in FIGS. 5B and 7B, to estimate position. For example, for the detector design shown in FIG. 7A and based on the modelling shown in FIG. 7B, if the left PMT 58 and the right PMT 68 have similar signals, the position of a gamma-ray interaction may be calculated to be somewhere near the middle of the scintillation body, e.g. D=0.75 cm. However if the output from the left PMT 58 is around twice that from the right PMT, the position of the gamma-ray interaction may be estimated to be around D=35 cm since this is position at which the LCE for the left-hand PMT 58 is around twice the LCE for the right-hand PMT 68.

The Inventors have used this approach to estimate the precision with which the position of a gamma-ray interaction can be determined both as a function of the position itself and the overall energy deposited in the scintillation body. Table 1 shows the results for the predicted error in the location based on statistical modelling of a 900 keV energy deposit as a function of the position along the scintillation body (at 10 cm intervals) for a detector having a design similar to that shown in FIG. 7A (i.e. 150 cm length and having a double-taper).

TABLE 1

| D (cm) | Error (cm) |
|---|---|
| 10 | +7/−9 |
| 20 | +12/−8 |
| 30 | +11/−7 |
| 40 | +10/−9 |
| 50 | +2/−3 |
| 60 | +4/−5 |
| 70 | +3/−3 |
| 80 | +2/−4 |
| 90 | +6/−6 |
| 100 | +8/−6 |
| 110 | +7/−9 |
| 120 | +9/−9 |
| 130 | +9/−14 |
| 140 | +9/−14 |

Thus the mean error in position estimate is around +/−8 cm, with a maximum error, which occurs towards the ends, of around +/−13 cm. Thus for this detector design and incident gamma-ray energy the detector may be divided into ten 15 cm wide position estimate bins with reasonable reliability. Even if only five spatial bins along the detector length are defined, in some applications this could provide a five-fold increase in signal-to-noise ratio. For example, if it is known that interactions of interest are occurring preferentially in bin 2 (because bin 2 is adjacent the source or because of shielding collimation of gamma-rays from the source), the background counts from the other four bins can be discarded on the grounds they do not occur in the appropriate bin, and so cannot be associated with the signal of interest. Thus the background counts may be reduced by a factor of five.

It will be appreciated that detectors based on other scintillation body materials, geometries and sizes may also employ a reflective layer in planar contact (i.e. not having an air gap over extended portions) with selected regions of the scintillation body to promote specular reflections in these regions. Furthermore, the reflective layer need not be a reflecting material bonded to the scintillation body and any form of reflective coating may be used, for example one applied using deposition techniques.

Furthermore, although the above described examples have employed PMTs coupled to the scintillation body, it will be appreciated that other types of photo-detector may be used. For example, the quantum efficiency provided by conventional PMTs is typically 20-25%, but newly emerging silicon photo-multipliers could provide an improved quantum efficiency of up to 70% or so. Use of these photo-detectors would increase both the spectral resolution and positional resolution of the spectrometer. Any other type of photo-detector able to detect the scintillator photons may equally be used.

Furthermore spectrometers according to embodiments of the invention may comprise a processor operable to process energy loss data obtained by the gamma-ray spectrometer by deconvolution using a response function computed for the gamma-ray spectrometer. This kind of technique can lead to significantly improved spectral resolution [2].

Thus there has been described a A gamma-ray detector comprising a large-area plastic scintillation body and a photon detector optically coupled to the scintillation body to receive and detect photons generated by gamma-ray interactions. Selected portions of the scintillation body surface are provided with a reflective layer in planar contact with the scintillation body. Other regions are not provided with a reflective layer. Thus specular reflection is promoted in at the surfaces provided with the reflective layer, while total internal reflection may occur in the regions which are not provided with a reflective layer. In a scintillation body generally in the form of a plank, the photon detector is coupled to one end, and the regions provided with the reflective layer are the edges of the plank. The scintillation body may be shaped so that it reduced in cross section in a direction away from the photon detector. The spectrometer may include photon detectors coupled to both ends of the scintillation body.

SUMMARY

The light-collection efficiency of a large plastic scintillation counter and the uniformity of its response, can be improved by providing a reflective layer in planar contact with the scintillation body in selective regions, e.g. by bonding a highly-reflective film to the edges of the sheet of scintillation plastic.

The light-collection efficiency and uniformity of the response of a gamma-ray detector when viewed from just one end (i.e. having a photodetector coupled to only one end) can be significantly improved by proving a reflective layer in selective planar contact with the scintillation body e.g. by bonding reflecting film to the remaining three edges, and by tapering the width of the detector from the photomultiplier to the end of the detector.

The light-collection efficiency and uniformity of the response of a long plastic scintillator when viewed by photo-detectors coupled to each end, can be improved significantly by providing a reflective layer in planar contact with the scintillation body, e.g. by bonding highly reflecting film to the two edges and by tapering the width of the plank inwards towards the centre of the detector.

These improvements to gamma-ray detector design allow for improved position estimates.

The detectors may be used in a range of applications, for example, in spectroscopic portal monitors, e.g. as used at points of entry into a state, or other security sensitive locations, in land remediation, and as particle hodoscopes. However, it will be appreciated these are only examples and that detectors according to embodiments of the invention may be used as general purpose gamma-ray detectors/spectrometers.

REFERENCES

[1] WO 05/001830 (Symetrica Limited)
[2] WO 02/031536 (Symetrica Limited)

The invention claimed is:

1. A gamma-ray spectrometer comprising a plastic scintillation body for receiving gamma-rays and creating photons therefrom, a photon detector optically coupled to the scintillation body so as to receive and detect the photons, and a reflective layer in planar contact with selected regions of the surface of the scintillation body so as to promote specular reflection of the photons from these selected regions, wherein the scintillation body is elongate and is substantially rectangular in cross section at positions along its length such that the surface of the scintillation body comprises two faces and two edges which are substantially parallel to the axis of extent, and two ends which are substantially perpendicular to the axis of extent, and wherein the photon detector is optically coupled to a one of the ends, and wherein the selected regions are the edges of the scintillation body, and do not comprise all of the surface of the scintillation body that is not coupled to the photon detector.

2. A gamma-ray spectrometer according to claim 1, wherein the reflective layer comprises a reflector bonded to the selected regions of the surface of the scintillation body.

3. A gamma-ray spectrometer according to claim 1, wherein the reflective layer comprises a coating deposited on the selected regions of the surface of the scintillation body.

4. A gamma-ray spectrometer according to claim 1, wherein the surface of the scintillation body has areas of differing optical flatness, and the selected regions are regions of relatively low optical flatness.

5. A gamma-ray spectrometer according to claim 1, wherein the scintillation body is provided with a reduction in cross-section with increasing distance from the photon detector.

6. A gamma-ray spectrometer according to claim 5, wherein the reduction in cross-section is between 15% and 25% along the length of the scintillation of body.

7. A gamma-ray spectrometer according to any of claims 5, wherein the scintillation body is linearly tapered away from photon detector to provide the reduction in cross-section.

8. A gamma-ray spectrometer according to claim 1, wherein the selected regions include an end of the scintillation body which is not optically coupled to the photon detector.

9. A gamma-ray spectrometer according to claim 1, further comprising a second photon detector optically coupled to an end of the scintillation body opposite to the end to which the first-mentioned photon detector is coupled.

10. A gamma-ray spectrometer according to claim 9, wherein the scintillation body is provided with a reduction in cross-section towards its centre with increasing distance from both the first mentioned and the second photon detectors.

11. A gamma-ray spectrometer according to claim 10, wherein the reduction in cross-section is between 15% and 25% between the respective photon detectors and the centre of the scintillation body.

12. A gamma-ray spectrometer according to claim 10, wherein the scintillation body is linearly tapered away from the respective photon detectors towards the centre of the scintillation body to provide the reduction in cross-section.

13. A gamma-ray spectrometer according to claim 9, further comprising a processor operable to sum output signals from the first-mentioned and the second photon detectors.

14. A gamma ray spectrometer according to claim 13, wherein the processor is further operable to perform a ratiometric analysis of the output signals to calculate the position of a gamma-ray interaction within the scintillation body.

15. A gamma-ray spectrometer according to claim 1, further comprising a layer of aluminium foil crinkle wrapped around the scintillation body.

16. A gamma-ray spectrometer according to claim 1, further comprising a light-blocking layer wrapped around the scintillation body.

17. A gamma-ray spectrometer according to claim 1, further comprising a processor operable to process energy loss data obtained by the gamma-ray spectrometer by deconvolution using a response function computed for the gamma-ray spectrometer.

18. A method of gamma-ray spectroscopy comprising:
providing an object to be analysed based on gamma rays, and
collecting energy-loss data for the object with a gamma-ray spectrometer comprising a plastic scintillation body for receiving gamma-rays and creating photons therefrom, a photon detector optically coupled to the scintillation body so as to receive and detect the photons, and a reflective layer in planar contact with selected regions of the surface of the scintillation body so as to promote specular reflection of the photons from these selected regions, wherein the scintillation body is elongate and is substantially rectangular in cross section at positions along its length such that the surface of the scintillation body comprises two faces and two edges which are substantially parallel to the axis of extent, and two ends which are substantially perpendicular to the axis of extent, and wherein the photon detector is optically coupled to a one of the ends, and wherein the selected regions are the edges of the scintillation body, and do not comprise all of the surface of the scintillation body that is not coupled to the photon detector.

19. A method of gamma-ray spectroscopy according to claim 18, further comprising processing the energy-loss data by deconvolution using a response function computed for the gamma-ray spectrometer.

* * * * *